United States Patent
Gim

(10) Patent No.: US 12,511,046 B2
(45) Date of Patent: Dec. 30, 2025

(54) MEMORY CONTROLLER CONTROLLING CACHE READ OPERATION, MEMORY SYSTEM INCLUDING THE MEMORY CONTROLLER, AND METHOD OF OPERATING THE SAME

(71) Applicant: SK hynix Inc., Gyeonggi-do (KR)

(72) Inventor: Yeong Dong Gim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 48 days.

(21) Appl. No.: 18/075,691

(22) Filed: Dec. 6, 2022

(65) Prior Publication Data

US 2024/0036730 A1 Feb. 1, 2024

(30) Foreign Application Priority Data

Jul. 28, 2022 (KR) .......................... 10-2022-0093952

(51) Int. Cl.
G06F 3/06 (2006.01)

(52) U.S. Cl.
CPC .............. *G06F 3/061* (2013.01); *G06F 3/064* (2013.01); *G06F 3/0653* (2013.01); *G06F 3/0673* (2013.01)

(58) Field of Classification Search
CPC ........ G06F 3/061; G06F 3/064; G06F 3/0653; G06F 3/0673
See application file for complete search history.

(56) References Cited

U.S. PATENT DOCUMENTS

| | | | | |
|---|---|---|---|---|
| 8,706,950 | B2* | 4/2014 | Yano | G06F 3/0631 714/6.1 |
| 2005/0286308 | A1* | 12/2005 | Nagashima | G11C 16/06 365/185.22 |
| 2009/0222617 | A1* | 9/2009 | Yano | G06F 3/0647 711/170 |
| 2015/0355700 | A1* | 12/2015 | Pusukuri | G06F 1/324 713/323 |
| 2017/0228161 | A1* | 8/2017 | Nangoh | G06F 3/0604 |
| 2017/0255385 | A1* | 9/2017 | Tokiwa | G11C 16/0483 |
| 2019/0227738 | A1* | 7/2019 | Youn | G06F 12/0246 |
| 2021/0166774 | A1* | 6/2021 | Cha | G11C 16/0483 |
| 2022/0050615 | A1* | 2/2022 | Teranishi | G06F 3/061 |
| 2022/0103191 | A1* | 3/2022 | Ganapathy | G06F 12/0895 |

FOREIGN PATENT DOCUMENTS

| | | |
|---|---|---|
| KR | 10-2019-0086921 A | 7/2019 |
| KR | 10-2019-0143310 A | 12/2019 |
| KR | 10-2020-0015260 A | 2/2020 |
| KR | 10-2021-0017264 A | 2/2021 |

* cited by examiner

*Primary Examiner* — Tasnima Matin
(74) *Attorney, Agent, or Firm* — IP & T GROUP LLP

(57) ABSTRACT

The present disclosure relates to an electronic device. A memory system according to the present disclosure includes a memory device including memory blocks each including a plurality of pages, a buffer memory configured to store information including a fail count of a cache read operation corresponding to each of the memory blocks, and a memory controller configured to control the memory device to perform a normal read operation or the cache read operation on a target memory block based on the fail count corresponding to the target memory block among the memory blocks.

20 Claims, 10 Drawing Sheets

MEMORY CONTROLLER CONTROLLING CACHE READ OPERATION, MEMORY SYSTEM INCLUDING THE MEMORY CONTROLLER, AND METHOD OF OPERATING THE SAME

CROSS-REFERENCE TO RELATED APPLICATION

The present application claims priority under 35 U.S.C. § 119(a) to Korean patent application number 10-2022-0093952, filed on Jul. 28, 2022, the entire disclosure of which is incorporated herein by reference.

BACKGROUND

1. Field of Invention

Various embodiments of the present disclosure relate to an electronic device, and more particularly, to a memory controller, a memory system including the memory controller, and a method of operating the same.

2. Description of Related Art

A memory system stores data under the control of a host device such as a computer or a smartphone. The memory system may include a memory device in which data is stored and a memory controller controlling the memory device. Memory devices may be classified into volatile memory devices and nonvolatile memory devices.

A nonvolatile memory device may not lost data stored therein even though power is cut off, and includes a read only memory (ROM), a programmable ROM (PROM), an electrically programmable ROM (EPROM), an electrically erasable and programmable ROM (EEPROM), a flash memory, and the like.

A read operation is an operation of obtaining data stored in memory cells. A threshold voltage distribution of the memory cells may be changed as the read operation is repeated. When a threshold voltage of the memory cells is changed, data obtained by the read operation may include many error bits. When the data obtained by the read operation includes many error bits, correction of the error bits may be impossible. When the correction of the error bit is impossible, an additional read operation may be performed to obtain data including a less number of error bits.

SUMMARY

An embodiment of the present disclosure provides a memory controller capable of preventing an increase of a data read time when a cache read operation is failed, a memory system including the memory controller, and a method of operating the same.

According to an embodiment of the present disclosure, a memory system includes a memory device including memory blocks each including a plurality of pages, a buffer memory configured to store information including a fail count of a cache read operation corresponding to each of the memory blocks, and a memory controller configured to control the memory device to perform a normal read operation or the cache read operation on a target memory block based on the fail count corresponding to the target memory block among the memory blocks.

According to an embodiment of the present disclosure, a method of operating a memory system may include storing information including a fail count of a cache read operation corresponding to each of memory blocks each including a plurality of pages, and performing a normal read operation or the cache read operation on a target memory block based on the fail count corresponding to the target memory block among the memory blocks.

According to an embodiment of the present disclosure, a memory controller may include an error corrector configured to perform an error correction operation of correcting an error of data read from a memory block by a cache read operation, a buffer memory configured to store information including a fail count which is a number of times the error correction operation on the memory blocks has failed, and an operation controller configured to provide one of a normal read command or a cache read command to a memory device based on a result of comparing a reference count with the fail count of the memory block.

According to an embodiment of the present disclosure, a method of operating a memory controller may include counting a number of times that a cache read operation fails with respect to a memory block within a memory device, and controlling the memory device to perform, instead of the cache read operation, a normal read operation with respect to the memory block when the number becomes greater than a threshold.

According to the present disclosure, a memory controller is capable of preventing an increase of a data read time when a cache read operation is failed.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
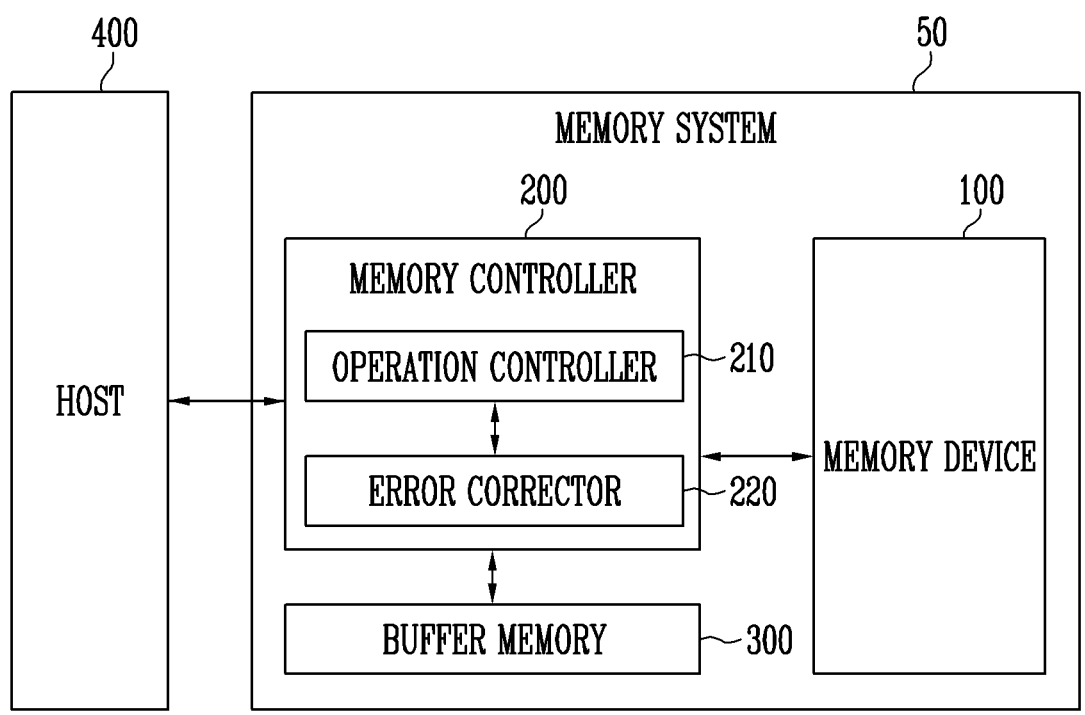
FIG. 1 is a diagram illustrating a memory system according to an embodiment of the present disclosure.

FIG. 1 is a diagram illustrating a memory system according to an embodiment of the present disclosure.

Referring to FIG. 1, the memory system 50 may include a memory device 100, a memory controller 200, and a buffer memory 300. The memory system 50 may be a device that stores data under the control of a host 400 such as a cellular phone, a smartphone, an MP3 player, a laptop computer, a desktop computer, a game player, a TV, a tablet PC, or an in-vehicle infotainment system.

The memory system 50 may be manufactured as one of various types of storage devices according to a host interface that is a communication method with the host 400. For example, the memory system 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The memory system 50 may be manufactured as any of various types of packages. For example, the memory system 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 may operate under the control of the memory controller 200. The memory device 100 may include a memory cell array (not shown) including a plurality of memory cells that store data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like.

The memory device 100 may be configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. The memory device 100 may program, read, or erase data in the area selected by the address.

The memory controller 200 may control an overall operation of the memory system 50.

When power is applied to the memory system 50, the memory controller 200 may execute firmware (FW). In an embodiment, the memory controller 200 may execute firmware to control communication between the host 400 and the memory device 100. In an embodiment, the memory controller 200 may convert a logical block address of the host into a physical block address of the memory device.

The memory controller 200 may control the memory device 100 to perform the write operation, the read operation, the erase operation, or the like according to a request of the host 400. The memory controller 200 may provide a command, a physical block address, or data to the memory device 100 according to the write operation, the read operation, or the erase operation.

In an embodiment, the memory controller 200 may generate a command, an address, and data independently regardless of the request from the host 400 and transmit the command, the address, and the data to the memory device 100. For example, the memory controller 200 may provide the command, the address, and the data for performing the read operation and the write operations accompanying in performing wear leveling, read reclaim, garbage collection, and the like, to the memory device 100.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other.

The buffer memory 300 may temporarily store data provided from the host 400 or temporarily store data read from the memory device 100. In an embodiment, the buffer memory 300 may be a volatile memory device. For example, the buffer memory 300 may be a dynamic random access memory (DRAM) or a static random access memory (SRAM). In an embodiment, the buffer memory 300 may be positioned outside the memory controller 200, or may be positioned inside the memory controller 200. In another embodiment, the buffer memory 300 may be positioned outside the memory system 50.

In an embodiment, the buffer memory 300 may store meta data. The meta data may be data including information used to operate the memory system 50. In an embodiment, the meta data may include map data indicating a corresponding relationship between a logical address of the host 400 and the physical address of the memory device 100.

In an embodiment, the buffer memory 300 may store information including a fail count read from the memory device 100. The information including the fail count may include the number of times a cache read operation on each memory block is failed.

In an embodiment, the information including the fail count may include the number of times a read retry operation is performed after the cache read operation on each memory block is failed. The information including the fail count may be updated when the cache read operation is failed.

The information including the fail count may further include read mode information. The read mode information may be read mode information for each memory block. The read mode information may include cache read allow information or cache read inhibit information. The cache read allow information may be information indicating that the cache read operation may be performed on a corresponding memory block. The cache read inhibit information may be information indicating that the cache read operation may not be performed on a corresponding memory block.

In an embodiment, when the fail count of a memory block is less than the reference count, the read mode information of a memory block may include the cache read allow information. In another embodiment, when the fail count of another memory block is equal to or greater than the reference count, the read mode information of the other memory block may include the cache read inhibit information.

In an embodiment, the memory controller 200 may include an operation controller 210 and an error corrector 220. The operation controller 210 may control the write, read, and erase operations on the memory device 100. In an embodiment, the operation controller 210 may read the data stored in the memory device 100 in response to a read request from the host 400. In an embodiment, the operation controller 210 may control the memory device 100 to perform a normal read operation or the cache read operation in response to the read request from the host 400.

The cache read operation may be an operation of sensing data stored in another page while outputting data stored in one page among a plurality of pages included in a selected memory block to the memory controller 200. In an embodiment, the cache read operation may be performed when a physical address of the one page and a physical address of the other page are consecutive sequential addresses. In an embodiment, the operation controller 210 may control the memory device 100 to perform the cache read operation when physical addresses of pages in which data corresponding to the read request of the host 400 are stored are consecutive addresses. In another embodiment, the operation controller 210 may control the memory device 100 to perform the cache read operation according to a preset condition regardless of the physical addresses of the pages in which data corresponding to the read request is stored.

The normal read operation may be an operation of outputting data stored in one page among the plurality of pages included in the memory device 100 to the memory controller 200 and sensing data stored in another page. In an embodiment, the operation controller 210 may control the memory device 100 to perform the normal read operation when the physical addresses of the pages in which the data corresponding to the read request of the host 400 are stored are not consecutive addresses.

In an embodiment, the operation controller 210 may provide a cache read command to the memory device 100 when the cache read operation is required. The operation controller 210 may receive the data read by the cache read operation from the memory device 100. The operation controller 210 may provide the data read by the cache read operation to the error corrector 220.

The error corrector 220 may perform an error correction operation of correcting an error of the data read by the cache read operation. When the number of error bits included in the data read by the cache read operation is less than the reference number of correctable error bits, the error correction operation may be passed. When the error correction operation is passed, the error corrector 220 may provide error corrected data to the operation controller 210, and the operation controller 210 may provide the error corrected data to the host 400.

However, when the number of error bits included in the data read by the cache read operation is greater than the reference number of correctable error bits, the error correction operation may be failed. The error corrector 220 may provide a signal to the operation controller 210 indicating that the error correction operation on the data read by the cache read operation is failed.

When the error correction operation on the data read by the cache read operation is failed, the operation controller 210 may control the memory device 100 to perform the read retry operation. The read retry operation may be an operation of reading the data stored in the memory device 100 using a read voltage different from a default read voltage used in the cache read operation. In an embodiment, the operation controller 210 may control the memory device 100 to perform the read retry operation using read retry voltages greater or less than a default voltage by an offset voltage. The operation controller 210 may provide the data read by the read retry operation to the error corrector 220. The error corrector 220 may provide the error corrected data to the operation controller 210 when the number of error bits included in the data read by the read retry operation is less than the reference number of error bits, and the operation controller 210 may provide the error corrected data to the host 400. That is, when the error correction for the data obtained by the cache read operation is failed, the cache read operation may be failed and the read retry operation may be performed.

In an embodiment, the operation controller 210 may count the number of times the error correction on the data read by the cache read operation is failed and the read retry operation is performed. When the error correction of the data read by the cache read operation is failed, the operation controller 210 may increase the fail count of the memory block on which the cache read operation is performed.

The operation controller 210 may update the read mode information of the memory block based on a result of comparing the fail count of the memory block and the reference count. In an embodiment, when the fail count of the memory block is equal to or greater than the reference count, the operation controller 210 may update the read mode information of the memory block to the cache read inhibit information.

The operation controller 210 may control the memory device 100 to perform the normal read operation or the cache read operation based on the read mode information of the memory block in which the data corresponding to the read request from the host 400 is stored. In an embodiment, when the read mode information of the memory block in which the data corresponding to the read request of the host 400 is stored includes the cache read inhibit information, the operation controller 210 may control the memory device 100 to read the data through the normal read operation. In another embodiment, when the read mode information of the memory block in which the data corresponding to the read request of the host 400 is stored includes the cache read allow information, the operation controller 210 may control the memory device 100 to read the data through the cache read operation.

The host 400 may communicate with the memory system 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
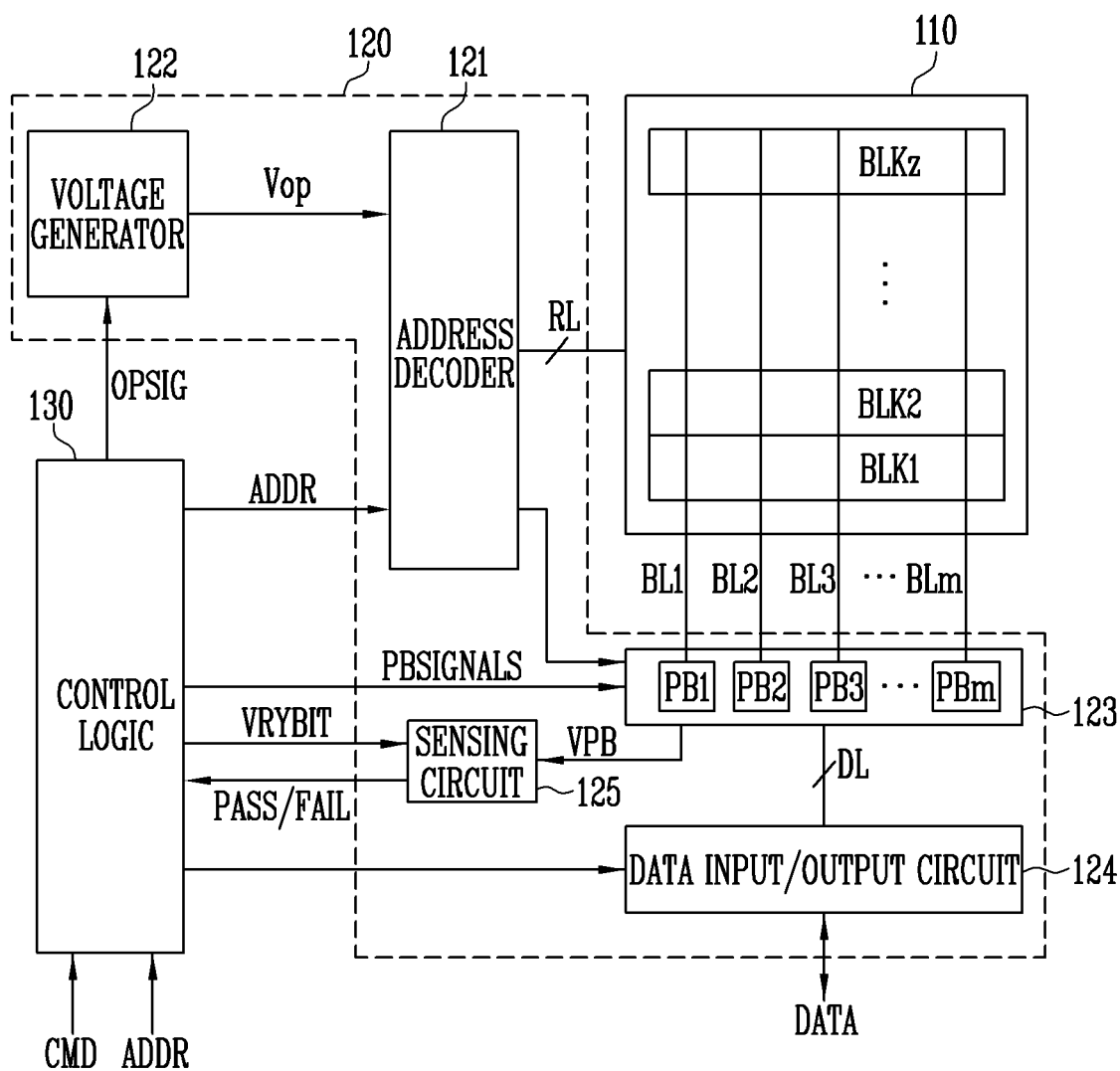
FIG. 2 is a diagram illustrating a structure of a memory device of FIG. 1 according to an embodiment of the present disclosure.

FIG. 2 is a diagram illustrating a structure of the memory device of FIG. 1 according to an embodiment of the present disclosure.

Referring to FIG. 2, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be connected to an address decoder 121 through row lines RL. The plurality of memory blocks BLK1 to BLKz may be connected to a page buffer group 123 through bit lines BL1 to BLm. Each of the plurality of memory blocks BLK1 to BLKz may include a plurality of memory cells. In an embodiment, the plurality of memory cells may be nonvolatile memory cells. Memory cells connected to the same word line among the plurality of memory cells may be defined as one page. That is, the memory cell array 110 may be configured as a plurality of pages. In an embodiment, the page may be a unit for storing data or reading stored data. The memory block may be a unit for erasing data. In an embodiment, each of the plurality of memory blocks BLK1 to BLKz included in the memory cell array 110 may include a plurality of dummy memory cells. At least one of the dummy memory cells may be connected in series between a drain select transistor and the memory cells and between a source select transistor and the memory cells.

Each of the memory cells of the memory device 100 may be configured as a single level cell (SLC) that stores one bit of data, a multi-level cell (MLC) that stores two bits of data, a triple level cell (TLC) that stores three bits of data, a quad level cell (QLC) capable of storing four bits of data, or memory cells that store five or more bits of data.

The peripheral circuit 120 may drive the memory cell array 110. For example, the peripheral circuit 120 may drive the memory cell array 110 to perform the program operation, the read operation, and the erase operation under the control of the control logic 130. As another example, the peripheral circuit 120 may apply various operation voltages to the row lines RL and the bit lines BL1 to BLm or discharge the applied voltages according to the control of the control logic 130.

The peripheral circuit 120 may include the address decoder 121, a voltage generator 122, the page buffer group 123, a data input/output circuit 124, and a sensing circuit 125.

The address decoder 121 may be connected to the memory cell array 110 through the row lines RL. The row lines RL may include drain select lines, word lines, source select lines, and a source line. In an embodiment, the word lines may include normal word lines and dummy word lines. In an embodiment, the row lines RL may further include a pipe select line.

The address decoder 121 may be configured to operate in response to the control of the control logic 130. The address decoder 121 may receive an address ADDR from the control logic 130.

The address decoder 121 may be configured to decode a block address of the received address ADDR. The address decoder 121 may select at least one memory block among the memory blocks BLK1 to BLKz according to the decoded block address. The address decoder 121 may be configured to decode a row address of the received address ADDR. The address decoder 121 may select at least one word line of the selected memory block by applying voltages provided from the voltage generator 122 to at least one word line WL according to the decoded row address.

During the program operation, the address decoder 121 may apply the program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

The erase operation of the memory device 100 may be performed in a memory block unit. The address ADDR input to the memory device 100 during the erase operation may include a block address. The address decoder 121 may decode the block address and select one memory block according to the decoded block address. During the erase operation, the address decoder 121 may apply a ground voltage to the word lines connected to the selected memory block.

The address decoder 121 may be configured to decode a column address of the transmitted address ADDR. The decoded column address may be transmitted to the page buffer group 123. As an example, the address decoder 121 may include a component such as a row decoder, a column decoder, and an address buffer.

The voltage generator 122 may be configured to generate a plurality of operation voltages Vop by using an external power voltage supplied to the memory device 100. The voltage generator 122 may operate in response to the control of the control logic 130.

As an example, the voltage generator 122 may generate an internal power voltage by regulating the external power voltage. The internal power voltage generated by the voltage generator 122 is used as an operation voltage of the memory device 100.

In an embodiment, the voltage generator 122 may generate the various operation voltages Vop used for the program, read, and erase operations in response to an operation signal OPSIG. The voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop.

The plurality of generated operation voltages Vop may be supplied to the memory cell array 110 by the address decoder 121.

The page buffer group 123 may include first to m-th page buffers PB1 to PBm. The first to m-th page buffers PB1 to PBm may be connected to the memory cell array 110 through first to m-th bit lines BL1 to BLm, respectively. The first to m-th page buffers PB1 to PBm may operate in response to the control of the control logic 130.

The first to m-th page buffers PB1 to PBm may communicate data DATA with the data input/output circuit 124. At a time of programming, the first to m-th page buffers PB1 to PBm may receive the data DATA through the data input/output circuit 124 and data lines DL.

During the program operation, the first to m-th page buffers PB1 to PBm may transmit the data DATA received through the data input/output circuit 124 to the selected memory cells through the bit lines BL1 to BLm. The memory cells of the selected page may be programmed according to the transmitted data DATA. A memory cell connected to a bit line to which a program allowable voltage (for example, a ground voltage) is applied may have an increased threshold voltage. A threshold voltage of a memory cell connected to a bit line to which a program inhibit voltage (for example, a power voltage) is applied may be maintained. During the program verify operation, the first to m-th page buffers PB1 to PBm may read the data DATA stored in the memory cells from the selected memory cells through the bit lines BL1 to BLm. During the read operation, the page buffer group 123 may read the data DATA from the memory cells of the selected page through the bit lines BL and store the read data DATA in the first to m-th page buffers PB1 to PBm.

During the erase operation, the page buffer group 123 may float the bit lines BL. In an embodiment, the page buffer group 123 may include a column selection circuit.

In an embodiment, while data stored in some of the page buffers among the plurality of page buffers included in the page buffer group 123 is programmed in the memory cell array 110, other page buffers may receive new data from the memory controller 200 and store the new data.

The data input/output circuit 124 may be connected to the first to m-th page buffers PB1 to PBm through the data lines DL. The data input/output circuit 124 may operate in response to the control of the control logic 130.

The data input/output circuit 124 may include a plurality of input/output buffers (not shown) that receive input data DATA. During the program operation, the data input/output circuit 124 may receive the data DATA to be stored from an external controller (not shown). During the read operation, the data input/output circuit 124 may output the data DATA transmitted from the first to m-th page buffers PB1 to PBm included in the page buffer group 123 to the external controller. During the read operation or the verify operation, the sensing circuit 125 may generate a reference current in response to a signal of an allowable bit VRYBIT generated by the control logic 130 and may compare a sensing voltage VPB received from the page buffer group 123 with a reference voltage generated by the reference current to output a pass signal or a fail signal to the control logic 130. For example, the sensing circuit 125 may output the pass signal to the control logic 130 when a magnitude of the sensing voltage VPB is greater than the reference voltage. As another example, the sensing circuit 125 may output the fail signal to the control logic 130 when the magnitude of the sensing voltage VPB is less than the reference voltage.

The control logic 130 may be connected to the address decoder 121, the voltage generator 122, the page buffer group 123, the data input/output circuit 124, and the sensing circuit 125. The control logic 130 may be configured to control all operations of the memory device 100. The control logic 130 may operate in response to a command CMD transmitted from an external device.

The control logic 130 may generate various signals in response to the command CMD and the address ADDR to control the peripheral circuit 120. For example, the control logic 130 may generate the operation signal OPSIG, the address ADDR, a page buffer control signal PBSIGNALS, and the allowable bit VRYBIT in response to the command CMD and the address ADDR. The control logic 130 may output the operation signal OPSIG to the voltage generator 122, output the address ADDR to the address decoder 121, output the page buffer control signal PBSIGNALS to the page buffer group 123, and output the allowable bit VRYBIT to the sensing circuit 125. In addition, the control logic 130 may determine whether the verify operation is passed or failed in response to the pass or fail signal PASS/FAIL output by the sensing circuit 125.

Figure 3:
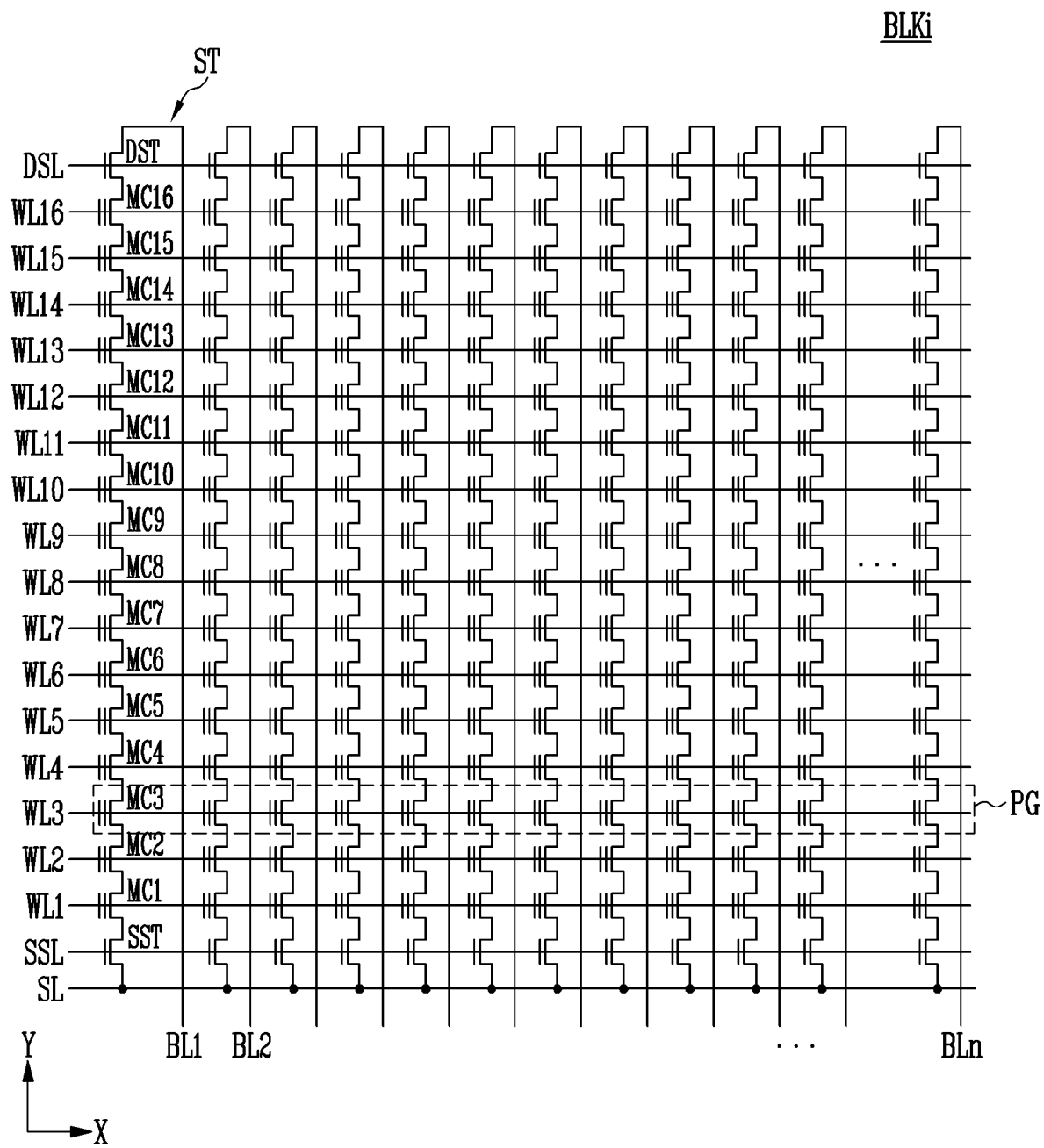
FIG. 3 is a diagram illustrating a structure of a memory block among a plurality of memory blocks BLK1 to BLKz of FIG. 2 according to an embodiment of the present disclosure.

FIG. 3 is a diagram illustrating a structure of a memory block among the plurality of memory blocks BLK1 to BLKz of FIG. 2 according to an embodiment of the present disclosure.

The memory block BLKi may be a memory block BLKi among the memory blocks BLK1 to BLKz shown in FIG. 2.

Referring to FIG. 3, a plurality of word lines arranged in parallel with each other between a first select line and a second select line may be connected. Here, the first select line may be a source select line SSL, and the second select line may be a drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured identically to each other, a string ST connected to the first bit line BL1 is specifically described as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and a number of memory cells MC1 to MC16 may also be included which is more than the number shown in the drawing.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a physical page PG. Therefore, the memory block BLKi may include the physical pages PG of the number of the plurality of word lines WL1 to WL16.

One memory cell may store one bit of data. This is commonly referred to as the SLC. In this case, one physical page PG may store one logical page (LPG) data. One logical page (LPG) data may include a number of data bits as the number of cells included in one physical page PG.

One memory cell may store two or more bits of data. In this case, one physical page PG may store two or more logical page (LPG) data.

Figure 4:
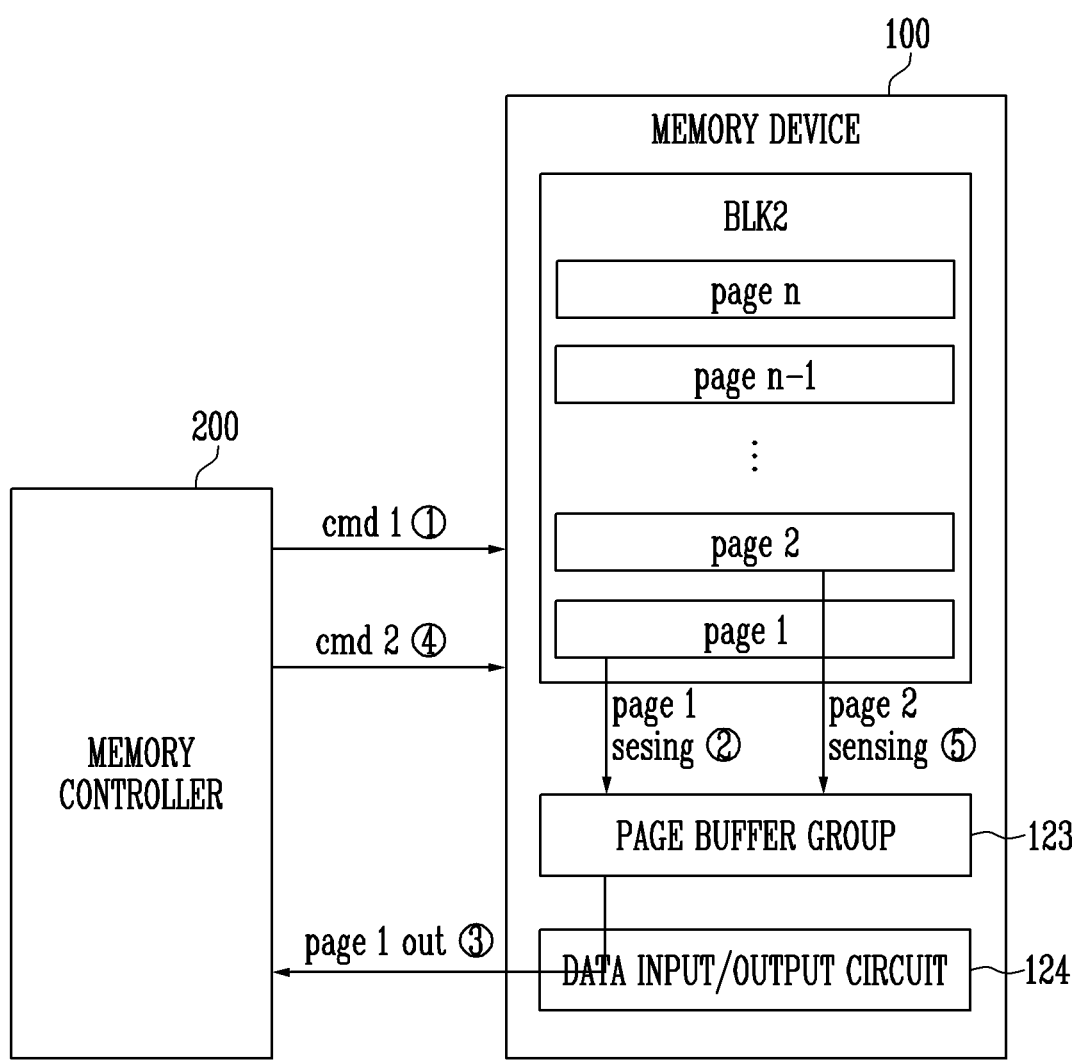
FIG. 4 is a diagram illustrating a normal read operation or a cache read operation according to an embodiment of the present disclosure.

FIG. 4 is a diagram illustrating the normal read operation or the cache read operation according to an embodiment of the present disclosure.

Referring to FIG. 4, the memory device 100 may include a second memory block BLK2, the page buffer group 123, and the data input/output circuit 124. The second memory block BLK2 may include a plurality of pages. In an embodiment, the second memory block may include first to n-th pages page 1 to page n. Each page may be a unit for storing data or reading stored data.

The normal read operation may be an operation of outputting data stored in any page among the plurality of pages page 1 to page n to the memory controller 200 and then sensing data stored in another page. Specifically, an order in which the normal read operation is performed may be as follows. The memory controller 200 may transmit a first read command cmd 1 to the memory device (①). The memory device 100 may sense data corresponding to the first read command from the first page to the page buffer group (②). In addition, the memory device 100 may output the data of the first page sensed to the page buffer group to the memory controller 200 through the data input/output circuit (③). Thereafter, the memory controller may transmit a second read command cmd 2 to the memory device (④). The memory device 100 may sense data corresponding to the second read command from the second page to the page buffer group (⑤). That is, during the normal read operation, operations of outputting the data stored in the first page to the memory controller 200 in response to the first read command cmd 1 and sensing the data stored in the second page in response to the second read command cmd 2 may be sequentially performed.

The cache read operation may be an operation of sensing data stored in another page while outputting data stored in any page among the plurality of pages page 1 to page n to the memory controller 200. Specifically, an order in which the cache read operation is performed may be as follows. The memory controller 200 may transmit the first read command cmd 1 to the memory device (①). The memory device 100 may sense data corresponding to the first read command from the first page to the page buffer group (②). In addition, the memory device 100 may output the data of the first page sensed to the page buffer group to the memory controller 200 through the data input/output circuit (③). The memory controller 200 may provide a second read command to the memory device (④) while receiving the data of the first page (③). The memory device 100 may sense data corresponding to the second read command from the second page to the page buffer group (⑤) while outputting the data of the first page to the memory controller (③). Thereafter, when all data of the first page are output to the memory controller 200, the data of the second page may be output to the memory controller 200. That is, during the cache read operation, the operation of outputting the data stored in the first page to the memory controller (③) and the operation of sensing the data stored in the second page (④, ⑤) may be simultaneously performed.

Figure 5:
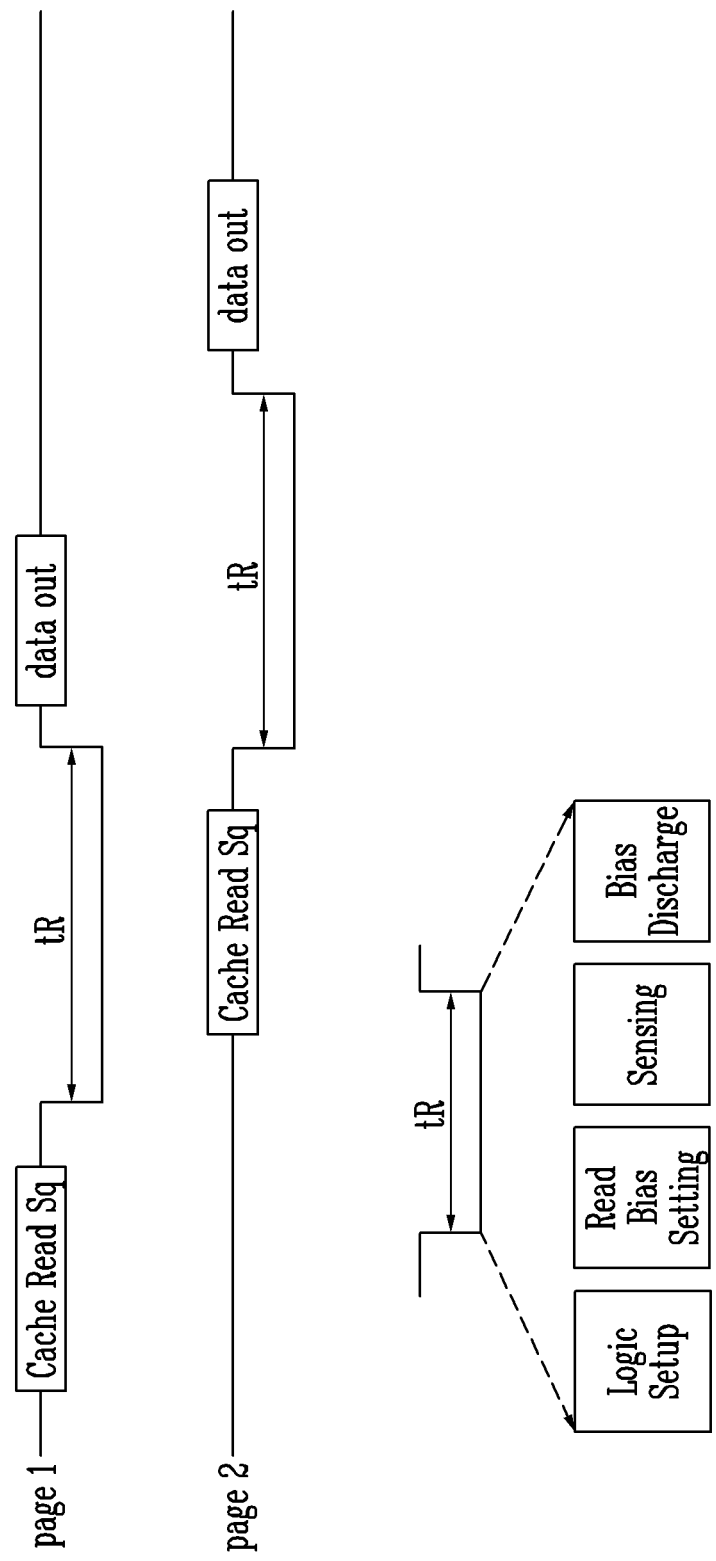
FIG. 5 is a diagram illustrating the cache read operation of the memory device according to an embodiment of the present disclosure.

FIG. 5 is a diagram illustrating the cache read operation of the memory device according to an embodiment of the present disclosure.

FIG. 5 is described with reference to FIG. 4.

Referring to FIG. 5, the memory device 100 may perform the cache read operation on data stored in the first page page 1 and data stored in the second page page 2. The memory device 100 may receive a cache read command sequence Cache Read Sq from the memory controller. In addition, when a time required for a sensing operation on one page is tR, a time of tR may be required to sense the data stored in the first page page 1 and the second page page 2 to the page buffer group. Thereafter, the data of the first page page 1 or the second page page 2 sensed to the page buffer group may be output to the memory controller 200 in response to a data output command.

The cache read operation may include a plurality of periods. For example, the cache read operation may include a logic setup period Logic Setup, a read bias setting period Read Bias Setting, a sensing period Sensing, and a bias discharge period Bias Discharge. The logic setup period Logic Setup may be a period in which a read command is received and logic related to the read command is set. For example, the logic setup period may be a period in which an algorithm for performing the cache read operation is loaded.

The read bias setting period Read Bias Setting may be a period in which a voltage related to the cache read operation is generated using the voltage generator and the generated voltage is applied. For example, in the read bias setting period Read Bias Setting, the memory device 100 may apply the read voltage to the selected word line and apply the pass voltage to the unselected word lines.

The sensing period Sensing may be a period in which the data stored in the memory cells is sensed after the read voltage or the pass voltage is applied to the plurality of word lines in the read bias setting period Read Bias Setting. For example, the data stored in the memory cells may be sensed to the page buffer group by sensing the voltage or the current of the bit lines connected to the memory cells.

The bias discharge period Bias Discharge may be a period in which voltages applied to the plurality of word lines and bit lines are discharged.

The cache read operation may be an operation in which an operation of sensing the data stored in the second page and an operation of outputting the data of the first page sensed to the page buffer group to the memory controller are simultaneously performed. Since each of the operation of sensing the data stored in the page and the operation of outputting the data sensed to the page buffer group to the memory controller requires a lot of driving power, when each of the operation of sensing the data stored in the page and the operation of outputting the data sensed to the page buffer group to the memory controller are simultaneously performed, power noise occurs, and thus a threshold voltage of the memory cells may be temporarily changed. That is, data obtained by the cache read operation may include a number of error bits greater than that of data obtained by the normal read operation.

Figure 6:
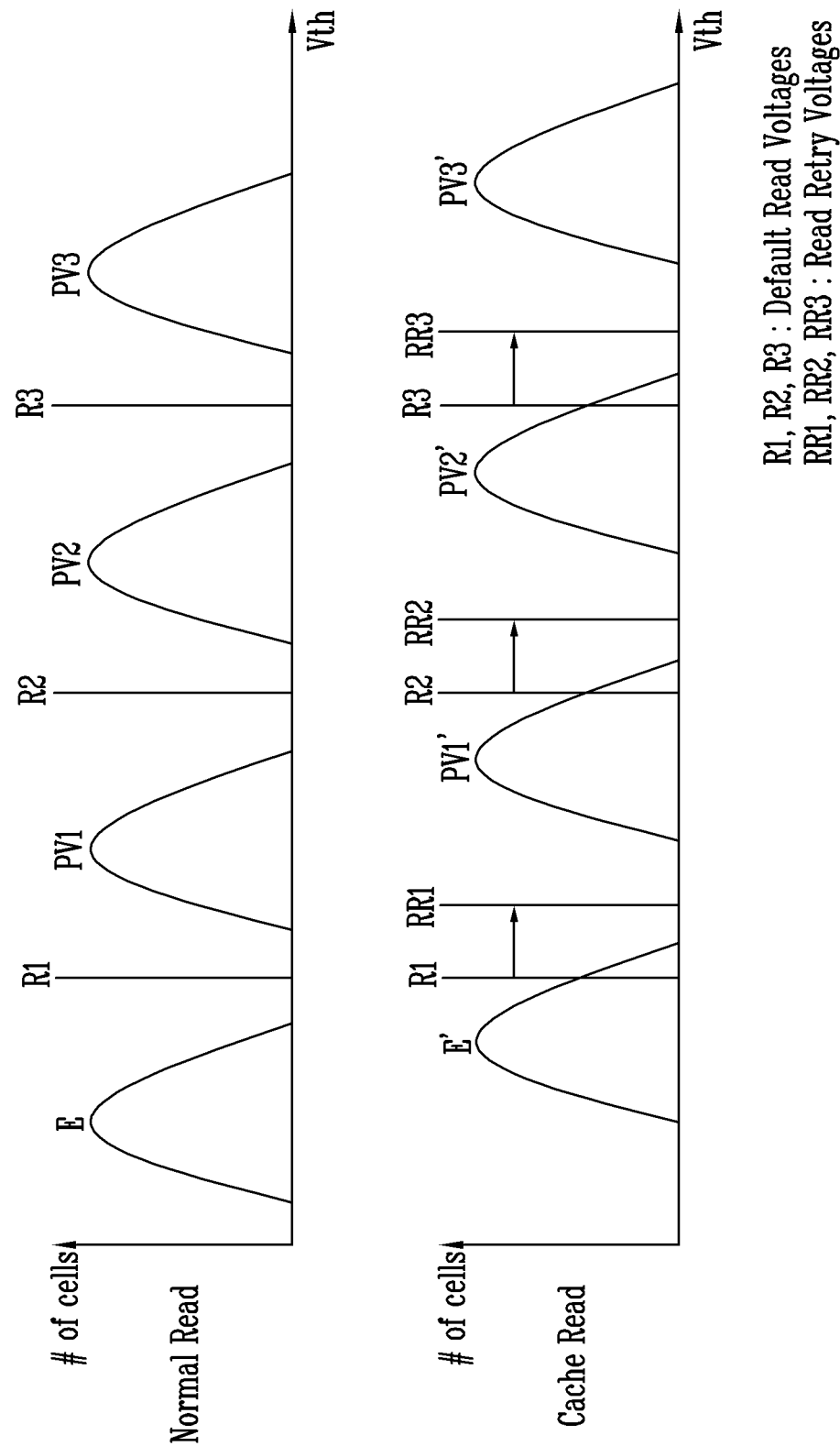
FIG. 6 is a diagram illustrating a threshold voltage distribution of memory cells according to the normal read operation and the cache read operation according to an embodiment of the present disclosure.

FIG. 6 is a diagram illustrating a threshold voltage distribution of the memory cells according to the normal read operation and the cache read operation according to an embodiment of the present disclosure.

In FIG. 6, a horizontal axis of a graph indicates a threshold voltage Vth of the memory cells, and a vertical axis of the graph indicates the number of memory cells # of cells. The graph of FIG. 6 is a graph illustrating a case in which each of the memory cells is the MLC storing two bits of data as an example. An embodiment of the present disclosure may also be applied to a case in which each of the memory cells stores one bit of data or three or more bits of data.

Referring to FIG. 6, the memory cells may be programmed to have a threshold voltage corresponding to any of an erase state E and first to third program states PV1 to PV3.

The first to third read voltages R1 to R3 may be default read voltages. The first to third read voltages R1 to R3 may be default read voltages used in the normal read operation or the cache read operation. The first read voltage R1 may be a read voltage that distinguishes between the erase state E and the first program state PV1. The second read voltage R2 may be a read voltage that distinguishes between the first program state PV1 and the second program state PV2. The third read voltage R3 may be a read voltage that distinguishes between the second program state PV2 and the third program state PV3.

During the normal read operation, the threshold voltage distribution of the memory cells may have a threshold voltage distribution of the erase state E, the first program state PV1, the second program state PV2, and the third program state PV3. However, during the cache read operation, the threshold voltage distribution of the memory cells may be changed to an erase state E', a first program state PV1', a second program state PV2', and a third program state PV3' due to power noise or the like.

Therefore, when the cache read operation is performed using the first to third read voltages R1 to R3 which are the default read voltages during the cache read operation, the number of error bits included in data read using the first to third read voltages R1 to R3 may increase. In addition, when the number of error bits included in the read data is greater than the reference number of error bits capable of error correction, the cache read operation may be failed. When the cache read operation is failed, the memory system may perform the read retry operation. The read retry operation may be an operation of obtaining the data stored in the memory cells using a read voltage different from the first to third read voltages R1 to R3 which are the default read voltages used in the cache read operation. In an embodiment, read retry voltages used in the read retry operation may be voltages greater than the first to third read voltages R1 to R3 by an offset voltage. For example, the read retry voltages may be first to third read retry voltages RR1 to RR3 shown in FIG. 6. When the number of error bits included in the data obtained by the read retry voltages is less than the reference number of error bits, the read retry operation may be ended. That is, when the cache read operation is failed, the read retry operation of obtaining the data stored in the memory cells using the read voltages different from the default voltages and performing the error correction operation on the data may be additionally performed. That is, when the cache read operation is failed, since the read retry operation is performed, a time required to read the data stored in the memory cells may increase.

Figure 7:
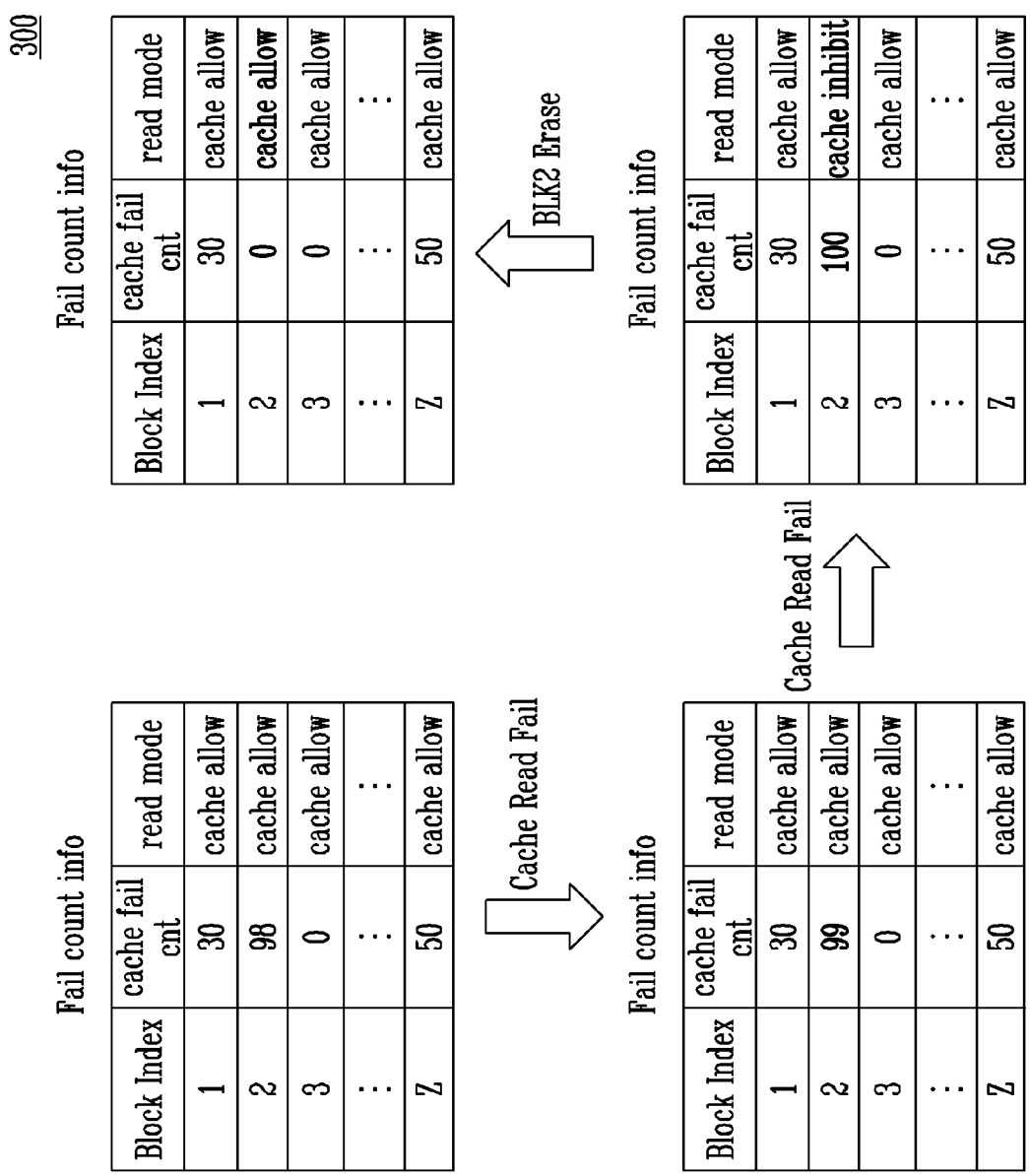
FIG. 7 is a diagram illustrating information including a fail count according to an embodiment of the present disclosure.

FIG. 7 is a diagram illustrating the information including the fail count according to an embodiment of the present disclosure.

Referring to FIG. 7, the buffer memory 300 shown in FIG. 1 may store information including fail count Fail count info. The information including fail count Fail count info may include a memory block index Block Index, a cache read fail count cache fail cnt, and read mode information read mode. The memory block index Block Index may mean an index of each memory block included in the memory device. For example, an index of the second memory block included in the memory device may be 2. The cache read fail count cache fail cnt may mean the number of times the cache read operation on each memory block is failed. For example, when the number of times the cache read operation on the second memory block is failed is 98, the cache read fail count cache fail cnt of the second memory block may be 98. In another embodiment, the cache read fail count cache fail cnt may mean the number of times the cache read operation on each memory block is failed and the read retry operation is performed.

The read mode information read mode may be information indicating a mode in which the read operation is performed on each memory block. The read mode information read mode may include cache read allow information cache allow or cache read inhibit information cache inhibit. The cache read allow information cache allow may be information indicating that the cache read operation may be performed on a corresponding memory block. The cache read inhibit information cache inhibit may be information indicating that the cache read operation may not be performed on a corresponding memory block.

Initial read mode information for each memory block may be set as the cache read allow information cache allow. In an embodiment, the initial read mode information for each of first to Z-th memory blocks may be set as the cache read allow information cache allow.

In an embodiment, when the cache read operation on the selected memory block is failed, the operation controller 210 shown in FIG. 1 may update the information including fail count Fail count info corresponding to the selected memory block. For example, when the cache read operation on the second memory block is failed, the operation controller 210 may increase the cache fail count cache fail cnt of the second memory block. The cache read fail count cache fail cnt of the second memory block may increase from 98 to 99.

In an embodiment, the operation controller 210 may update the read mode information read mode of the memory block on which the cache read operation is failed based on a result of comparing the cache read fail count cache fail cnt of the memory block on which the cache read operation is failed and a reference count. Specifically, when the cache read fail count cache fail cnt of the memory block on which the cache read operation is failed is less than the reference count, the operation controller 210 may not update the read mode information read mode of the memory block on which the cache read operation is failed. For example, when the reference count is 100 as an example, since the fail count 99 of the second memory block is less than the reference count 100, the read mode information read mode of the second memory block may include the initially set cache read allow information cache allow.

In an embodiment, when the cache read fail count cache fail cnt of the memory block on which the cache read operation is failed is equal to or greater than the reference count, the operation controller 210 may update the read mode information read mode of the memory block on which the cache read operation is failed. For example, when the cache read operation on the second memory block is failed again in a state in which the fail count of the second memory block is 99, the cache read fail count of the second memory block may increase from 99 to 100. In addition, the operation controller 210 may compare the cache read fail count of 100 of the second memory block with the reference count of 100. Since the cache read fail count of the second memory block and the reference count are the same, the operation controller 210 may update the read mode information read mode of the second memory block with the cache read inhibit information cache inhibit.

Thereafter, when receiving the read request from the host 400, the operation controller 210 may control the memory device to read data in one of the cache read operation or the normal read operation based on the read mode information of a memory block in which data corresponding to the read request is stored. In an embodiment, when the read mode information read mode of the memory block includes the cache read inhibit information cache inhibit, the operation controller 210 may control the memory device to read the data stored in the memory block in the normal read operation. For example, when the cache read fail count of the second memory block is 100, since the read mode information read mode of the second memory block includes the cache read inhibit information cache inhibit, the operation controller may control the memory device to perform the normal read operation on the second memory block. In an embodiment, the operation controller 210 may provide a normal read command and an address of the second memory block to the memory device.

In another embodiment, when the read mode information read mode of the memory block includes the cache read allow information cache allow, the operation controller 210 may control the memory device to read the data stored in the memory block in the cache read operation. For example, since the cache read fail count of the first memory block is 30, which is less than the reference count 100, the read mode information read mode of the first memory block may include the cache read allow information cache allow. When the memory block in which the data corresponding to the read request is stored is the first memory block, the operation controller 210 may control the memory device to read the data stored in the first memory block in the cache read operation. In an embodiment, the operation controller 210 may provide the cache read command and an address of the first memory block to the memory device.

In an embodiment, when an erase request for a memory block among the plurality of memory blocks is received, the operation controller 210 may initialize the cache read fail count cache fail cnt and the read mode information read mode of the memory block. Initialization of the cache read fail count cache fail cnt may mean that the fail count is set to 0. Initialization of the read mode information read mode may mean resetting to the initially set cache read allow information cache allow. For example, when an erase operation on the second memory block is performed, the cache read fail count cache fail cnt of the second memory block may be set to 0, and the read mode information read mode of the second memory block may be set to the cache read allow information cache allow.

In another embodiment, when receiving the read request from the host, the operation controller 210 may compare the cache read fail count cache fail cnt of a memory block to be read among the plurality of memory blocks with the reference count. The memory block to be read may be the memory block in which the data corresponding to the read request from the host is stored. The operation controller 210 may control the memory device to read the data stored in the memory block to be read in one of the cache read operation and the normal read operation based on a result of comparing the cache read fail count cache fail cnt of the memory block to be read and the reference count.

Figure 8:
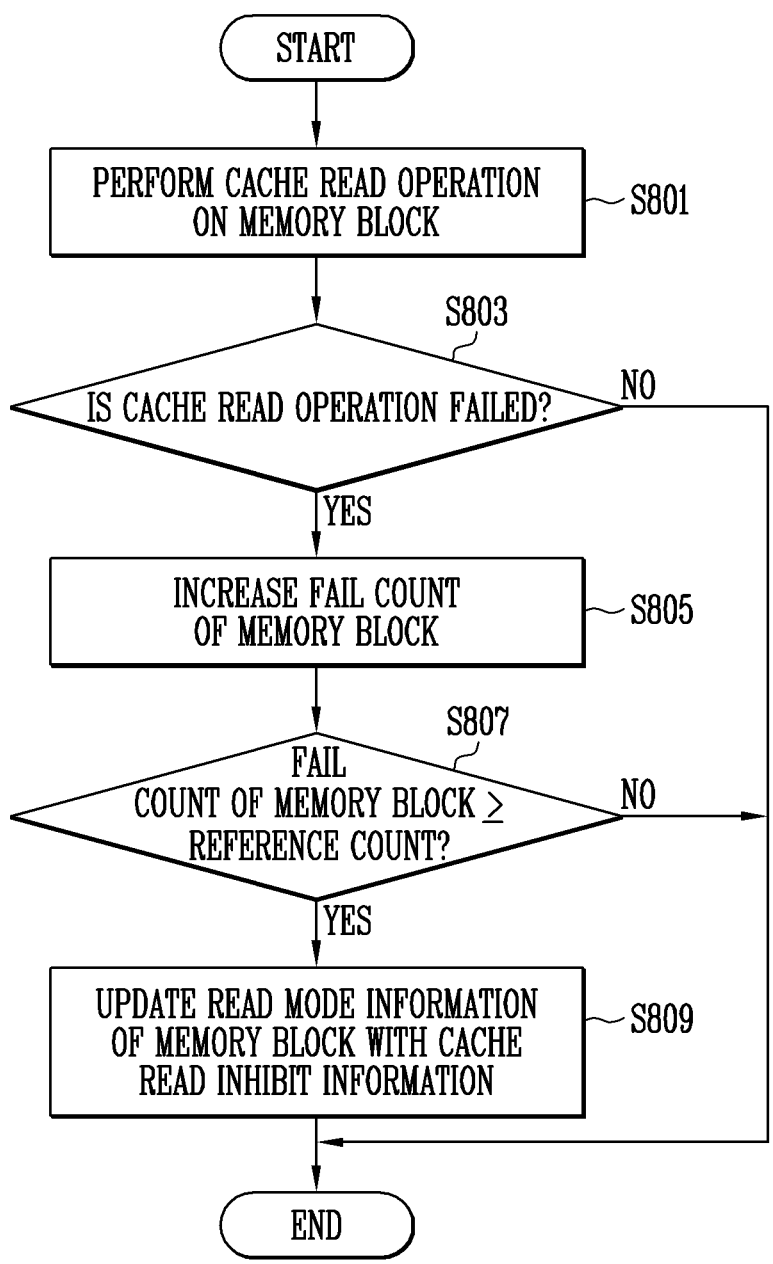
FIG. 8 is a flowchart illustrating an operation of updating the information including the fail count according to an embodiment of the present disclosure.

FIG. 8 is a flowchart illustrating an operation of updating the information including the fail count according to an embodiment of the present disclosure.

Referring to FIG. 8, in operation S801, the memory system 50 may perform the cache read operation on the memory block. The cache read operation may be an operation of sensing data stored in another page while outputting data stored in a page among the plurality of pages included in the memory block to the memory controller. Addresses of the page and the other page may be consecutive addresses.

In operation S803, the memory system 50 may determine whether the cache read operation on the memory block is failed. When error correction of the data obtained by the cache read operation is failed, the cache read operation may be failed. When the cache read operation is failed, the read retry operation may be performed. When the cache read operation on the memory block is failed, operation S805 may be performed. Alternatively, when the cache read operation on the memory block is passed, the operation may be ended.

In operation S805, the memory system 50 may increase the fail count of the memory block when the cache read operation on the memory block is failed.

In operation S807, the memory system 50 may compare the fail count of the memory block with the reference count.

When the fail count of the memory block is equal to or greater than the reference count, operation S809 may be performed. Alternatively, when the fail count of the memory block is less than the reference count, the operation may be ended.

In operation S809, the memory system 50 may update the read mode information of the memory block with the cache read inhibit information.

Figure 9:
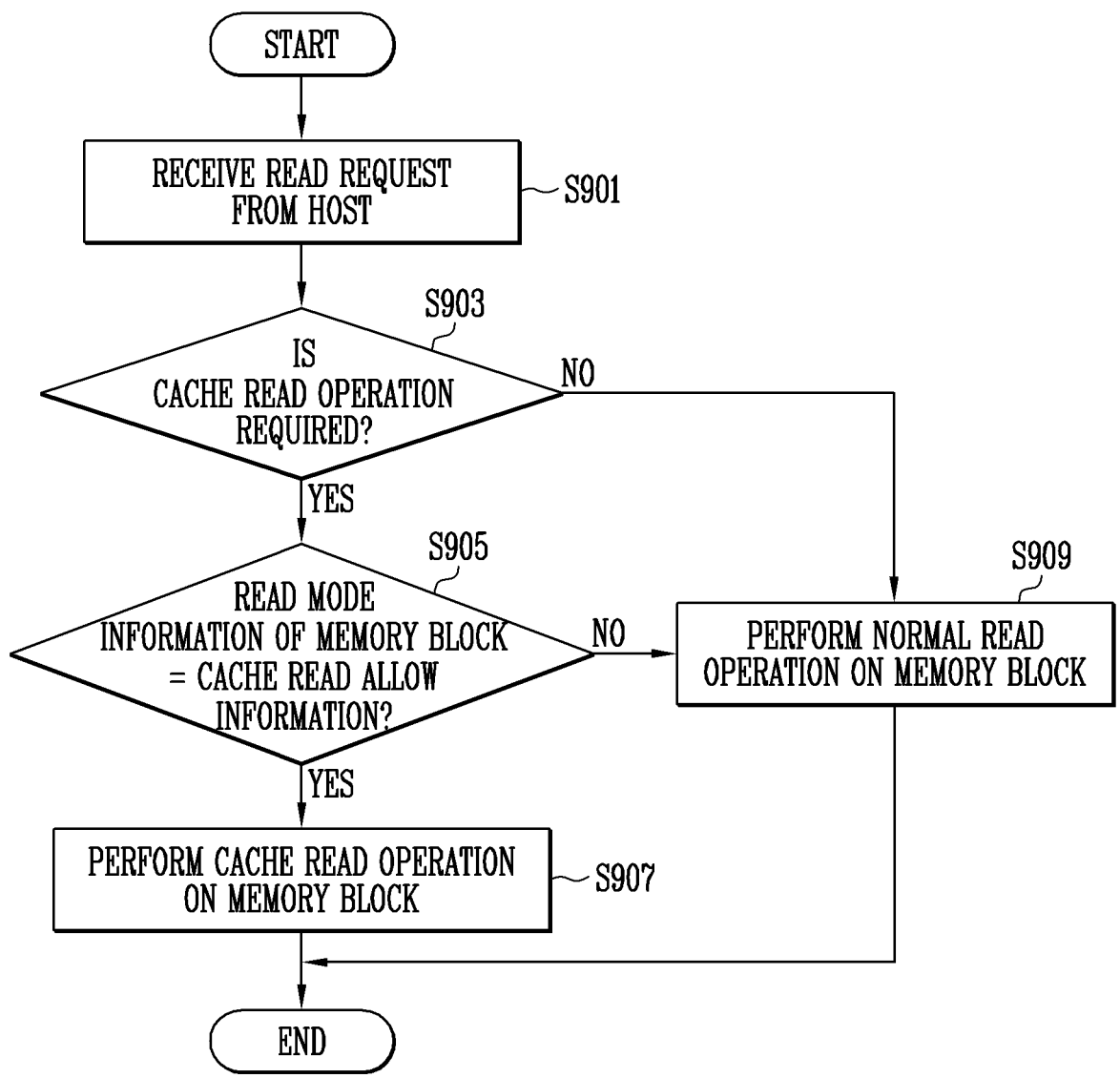
FIG. 9 is a flowchart illustrating the normal read operation or the cache read operation of the memory system according to an embodiment of the present disclosure.

FIG. 9 is a flowchart illustrating the normal read operation or the cache read operation of the memory system according to an embodiment of the present disclosure.

Referring to FIG. 9, in operation S901, the memory system 50 may receive the read request from the host.

In operation S903, the memory system 50 may determine whether the cache read operation is required in response to the read request from the host. In an embodiment, when physical addresses in which data corresponding to the read request is stored have consecutive addresses, the cache read operation may be performed. In another embodiment, the memory system 50 may perform the cache read operation when a preset condition is satisfied. When the cache read operation is required to be performed, operation S905 may be performed. Alternatively, when the cache read operation is not required to be performed, operation S909 may be performed.

In operation S905, the memory system 50 may determine whether the read mode information of the memory block in which the data corresponding to the read request is stored includes the cache read allow information. When the read mode information of the memory block includes the cache read allow information, operation S907 may be performed. Alternatively, when the read mode information of the memory block does not include the cache read allow information, operation S909 may be performed.

In operation S907, the memory system 50 may perform the cache read operation on the memory block when the read mode information of the memory block in which the data corresponding to the read request is stored includes the cache read allow information.

In operation S909, the memory system 50 may perform the normal read operation on the memory block when the cache read operation is not required to be performed. The normal read operation may be an operation of outputting the data stored in a page among the plurality of pages included in the memory block to the memory controller and then sensing the data stored in another page. In addition, the memory system 50 may perform the normal read operation on the memory block when the read mode information of the memory block in which the data corresponding to the read request is stored includes the cache read inhibit information.

Figure 10:
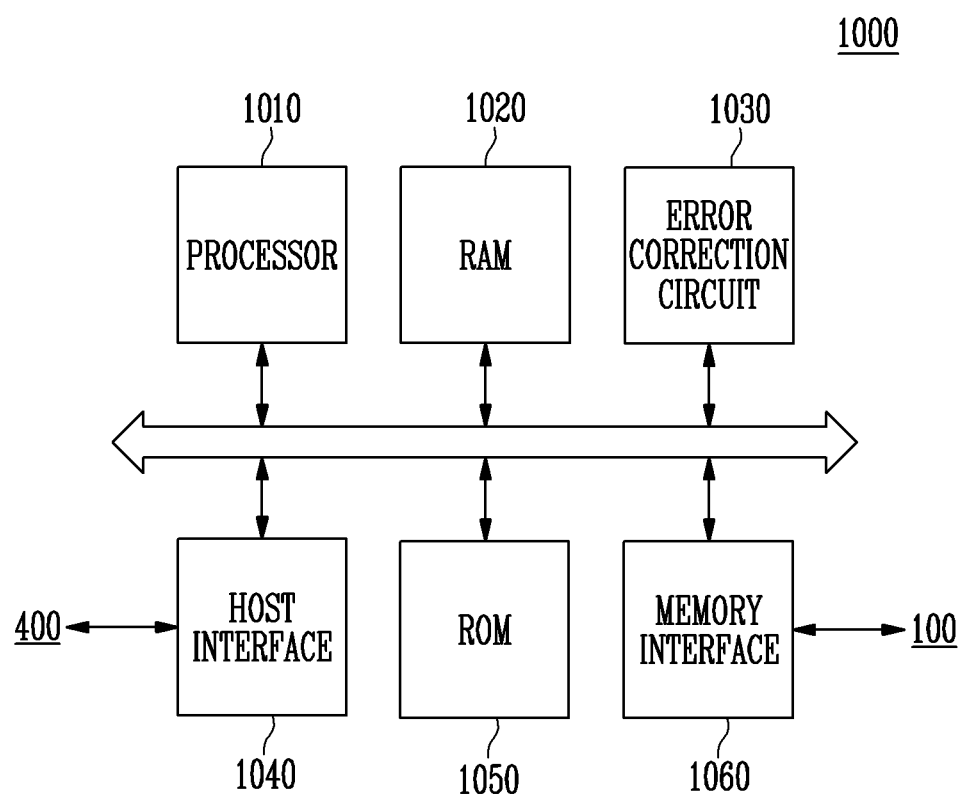
FIG. 10 is a diagram illustrating a memory controller of FIG. 1 according to an embodiment of the present disclosure.

FIG. 10 is a diagram illustrating the memory controller of FIG. 1 according to an embodiment of the present disclosure.

The memory controller 1000 of FIG. 10 may indicate the memory controller 200 of FIG. 1.

Referring to FIG. 10, the memory controller 1000 may include a processor 1010, a RAM 1020, an error correction circuit 1030, a host interface 1040, a ROM 1050, and a memory interface 1060.

The processor 1010 may control an overall operation of the memory controller 1000. The processor 1010 may control an operation of the memory controller 1000 to store data requested from the host 400 in the memory device 100. In an embodiment, the processor 1010 may include the operation controller 210 shown in FIG. 1. In an embodiment, the processor 1010 may control the memory device 100 to read the data in one of the normal read operation and the cache read operation according to read mode information determined based on a result of comparing the fail count of the memory block and the reference count.

The RAM 1020 may be used as a buffer memory, a cache memory, an operation memory, and the like of the memory controller 1000. In an embodiment, the buffer memory 300 shown in FIG. 1 may be included in the RAM 1020. In an embodiment, the RAM 1020 may store the information including the fail count including the index of each memory block, the cache read fail count, and the read mode information.

The error correction circuit 1030 may perform error correction. The error correction circuit 1030 may perform error correction encoding (ECC encoding) based on data to be written to the memory device 100 through the memory interface 1060. The error correction encoded data may be transmitted to the memory device 100 through the memory interface 1060. The error correction circuit 1030 may perform error correction decoding (ECC decoding) on data received from the memory device 100 through the memory interface 1060. In an embodiment, the error correction circuit 1030 may include the error corrector 220 shown in FIG. 1. In an embodiment, the error correction circuit 1030 may correct an error of data read by the cache read operation. For example, the error correction circuit 1030 may be included in the memory interface 1060 as a component of the memory interface 1060.

The ROM 1050 may store various pieces of information required to operate the memory controller 1000 in a form of firmware.

The memory controller 1000 may communicate with an external device (for example, the host 400, an application processor, or the like) through the host interface 1040. The memory controller 1000 may receive data through the host interface 1040. In an embodiment, the host interface 1040 may receive the read request from the host 400.

The memory controller 1000 may communicate with the memory device 100 through the memory interface 1060. The memory controller 1000 may transmit a command, an address, a control signal, and the like to the memory device 100 through the memory interface 1060, and may receive data. For example, the memory interface 1060 may include a NAND interface.

What is claimed is:

1. A memory system comprising:
   a memory device including memory blocks each including a plurality of pages;
   a buffer memory configured to store information including a fail count including a number of times a cache read operation on each of the memory blocks has failed; and
   a memory controller configured to control the memory device to perform a normal read operation or the cache read operation on a target memory block based on the fail count corresponding to the target memory block among the memory blocks,
   wherein the cache read operation includes an operation of sensing data stored in a page while outputting data stored in another page among the plurality of pages within a memory block.

2. The memory system of claim 1, wherein the normal read operation includes an operation of outputting data stored in a page and then sensing data stored in another page among the plurality of pages within a memory block.

3. The memory system of claim 2, wherein the memory controller comprises:
   an error corrector configured to perform an error correction operation of correcting an error of data read from a memory block by the cache read operation; and
   an operation controller configured to update the fail count corresponding to the memory block when the error correction operation fails by exceeding an error correction capability of the error corrector.

4. The memory system of claim 3, wherein the information including the fail count corresponding to each of the memory blocks further includes read mode information indicating whether the cache read operation on the corresponding memory block is allowed.

5. The memory system of claim 4, wherein the operation controller is further configured to update the read mode information based on a result of comparing the fail count corresponding to each of the memory blocks with a reference count.

6. The memory system of claim 5, wherein the operation controller is configured to update, to cache read inhibit information, the read mode information of a corresponding memory block, corresponding to which the fail count is equal to or greater than the reference count among the memory blocks.

7. The memory system of claim 6, wherein the operation controller is configured to update, to cache read allow information, the read mode information of a corresponding memory block, corresponding to which the fail count is less than the reference count among the memory blocks.

8. The memory system of claim 7, wherein the operation controller is configured to control the memory device to perform the normal read operation on the target memory block when the read mode information corresponding the target memory block includes the cache read inhibit information.

9. The memory system of claim 8, wherein the operation controller is configured to control the memory device to perform the cache read operation on the target memory block when the read mode information corresponding to the target memory block includes the cache read allow information.

10. The memory system of claim 9, wherein the operation controller is configured to initialize the fail count and the read mode information corresponding to a memory block on which an erase operation is to be performed among the memory blocks.

11. A method of operating a memory system, the method comprising:
    storing information including a fail count including a number of times a cache read operation on each of memory blocks has failed, each of the memory blocks including a plurality of pages; and
    performing a normal read operation or the cache read operation on a target memory block based on the fail count corresponding to the target memory block among the memory blocks,
    wherein the cache read operation includes an operation of sensing data stored in a page while outputting data stored in another page among the plurality of pages within a memory block.

12. The method of claim 11, wherein the information including the fail count corresponding to each of the memory blocks further includes read mode information indicating whether the cache read operation on the corresponding memory block is allowed.

13. The method of claim 12, wherein the read mode information includes cache read inhibit information when the fail count is equal to or greater than a reference count.

14. The method of claim 13, wherein the read mode information includes cache read allow information when the fail count is less than the reference count.

15. The method of claim 14, wherein the performing the normal read operation or the cache read operation comprises performing the normal read operation on the target memory block when the read mode information corresponding to the target memory block includes the cache read inhibit information.

16. The method of claim 15, wherein the performing the normal read operation or the cache read operation further comprises performing the cache read operation on the target memory block when the read mode information corresponding to the target memory block includes the cache read allow information.

17. A memory controller comprising:
an error corrector configured to perform an error correction operation of correcting an error of data read from a memory block by a cache read operation;
a buffer memory configured to store information including a fail count which is a number of times the cache read operation on the memory block has failed; and
an operation controller configured to provide one of a normal read command or a cache read command to a memory device based on a result of comparing a reference count with the fail count of the memory block,
wherein the cache read command is configured to instruct to read data stored in a page while data stored in another page among a plurality of pages is output.

18. The memory controller of claim 17, wherein the operation controller is configured to provide the normal read command to the memory device when the fail count of the memory block is equal to or greater than the reference count.

19. The memory controller of claim 18, wherein the operation controller is configured to provide the cache read command to the memory device when the fail count of the memory block is less than the reference count.

20. The memory controller of claim 19, wherein the normal read command is configured to instruct to read data stored in another page after data stored in a page among the plurality of pages included in the memory block is output.

* * * * *